United States Patent
Banks

[15] 3,660,232
[45] May 2, 1972

[54] INTERLOCKED ASSEMBLY OF BLOCKS FOR A NUCLEAR REACTOR MODERATING CORE

[72] Inventor: Robert Banks, Timperley, Cheshire, England

[73] Assignee: United Kingdom Atomic Energy Authority, London, England

[22] Filed: Mar. 13, 1969

[21] Appl. No.: 806,958

[30] Foreign Application Priority Data

Mar. 21, 1968 Great Britain......................13,841/68

[52] U.S. Cl..................................................176/84, 176/92
[51] Int. Cl. ........................................G21c 5/00, G21c 5/14
[58] Field of Search ...................................176/84, 35, 37, 43

[56] References Cited

UNITED STATES PATENTS

| | | | |
|---|---|---|---|
| 3,152,965 | 10/1964 | Lemesle et al. | 176/84 |
| 3,342,693 | 9/1967 | Triggs | 176/84 |
| 3,351,535 | 11/1967 | Warner | 176/84 |

FOREIGN PATENTS OR APPLICATIONS 985,969  3/1965  Great Britain..........................176/84

Primary Examiner—Carl D. Quarforth
Assistant Examiner—Roger S. Gaither
Attorney—Larson, Taylor and Hinds

[57] ABSTRACT

A moderator structure is provided wherein bodies of moderator material are stacked in layers to provide juxta posed columns. The bodies are each provided with splines which have side faces lying in planes passing through the longitudinal axis of the body. Bodies in a given layer abut one another only by said side faces.

5 Claims, 3 Drawing Figures

INTERLOCKED ASSEMBLY OF BLOCKS FOR A NUCLEAR REACTOR MODERATING CORE

BACKGROUND OF THE INVENTION

The present invention concerns moderator structures for nuclear reactors. In particular it is concerned with such structures when formed from an assembly of bodies in a three-dimensional array of columns and layers interlocked with each other.

Such an assembly could, for example, be a moderating core structure of a solid moderated reactor such as the Advanced Gas-cooled Reactor. There are problems of dimensional changes due to irradiation and temperature in such structures but nevertheless it is desired to preserve the center lines of at least the central columns, that is those which have fuel channels therethrough, in a stable position.

SUMMARY OF THE INVENTION

According to the present invention a moderator structure comprises superposed layers of moderator material comprising elongate bodies orientated to extend through the layers which thereby define juxtaposed parallel columns of the bodies with their longitudinal axes perpendicular to the layers, at least one layer having the following features: the bodies therein have at least three splines; the side faces of the splines on a body lie in planes passing through the longitudinal axis of that body; and the side faces of the splines on a body abut the side faces of splines on neighboring bodies.

In a preferred embodiment of the invention locking members are disposed in interstices between bodies having splines each locking member having complementary faces adapted to abut side faces of the splines to prevent relative movement thereof.

DESCRIPTION OF THE DRAWINGS

An embodiment of the invention will now be described with reference to the accompanying drawings of a moderator core structure for an AGR.

DESCRIPTION OF THE PREFERRED EMBODIMENT

Figure 1:
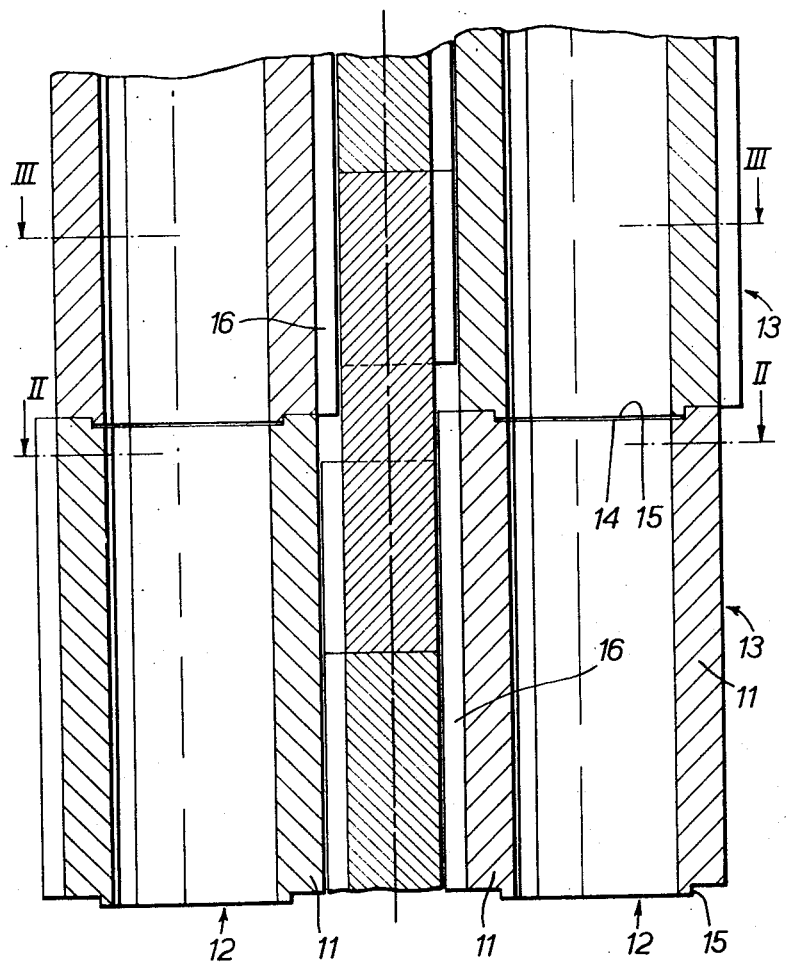
FIG. 1, an axial section through two adjoining columns.

The structure is an assembly of graphite bodies 11 in a substantially uniform three dimensional cubical array of wherein columns 12 are defined by layers 13 superposed one upon another. The bodies in each column have recesses 14 and projections 15 which co-act so that each block locates the one above it centrally. The columns 12 are laid out on a square pitch and the bodies are substantially cylindrical with splines 16 running in the longitudinal direction of the column. The side faces 17 of the splines 16 lie in planes passing through a longitudinal axis of the column (in this case the center line or axis of rotation of the column).

Figure 2:
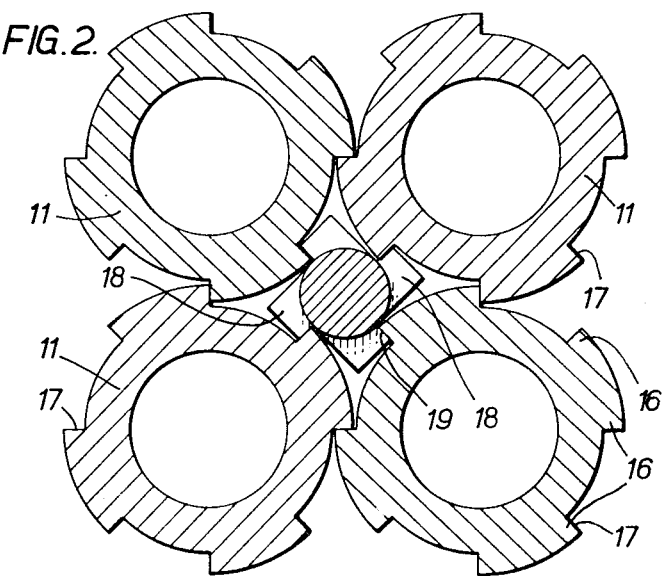
FIGS. 2 and 3, transverse sections through adjoining layers.
Figure 3:
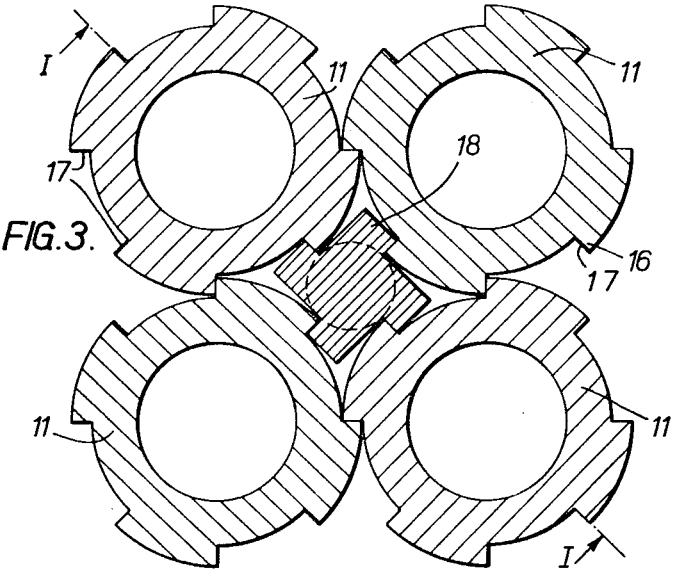

Each body engages each of its neighbors by a spline 16 which abuts with a spline 16 of the neighbor in the manner of gear teeth. With the center lines of the column in the square array shown in FIGS. 2 and 3, this engagement will result in those side faces 17 abutting which prevent rotation of the bodies about their own axis in a sense (clockwise or anticlockwise) which is common to all bodies in the layer (clockwise in FIG. 2, anticlockwise in FIG. 3) assuming of course that the bodies do not rotate each other. Locking members 18 fit into the interstices between the bodies and present complementary faces 19 to all the remaining side faces of splines on adjacent bodies to prevent rotation in the reverse sense. The member 18 is non-rotational because it extends through two layers so that in one the tendency for any rotation is in one sense and another layer wherein the tendency is reversed angularly offsetting the splines as between the layers as can be seen by comparing FIGS. 2 and 3. Control rod channels can be provided in these members. Any shrinkage or expansion causes sliding of the abutting side faces in a radial direction so the center lines are not displaced. Any tendency for shear breakage is resisted, as can be seen from FIGS. 2 or 3, by a larger shear area than would be possible for conventional keys to provide. Separation of the columns is resisted by the spline forming a dovetail held between a side face 17 and a face 19 on a member 18 which is itself captive.

I claim:

1. A moderator structure comprising superposed layers of moderator material, each layer comprising a plurality of parallel elongate bodies which extend through said layer, and elongate locking members disposed in interstices between said bodies, said bodies of said layers co-operating to define juxtaposed parallel columns of stacked bodies with the longitudinal axes of the columns perpendicular to said layers, each of said bodies in said layers having at least three external splines arranged with both side faces of each spline lying in planes passing through the longitudinal axis of the body, each locking member having faces complimentary to side faces of said splines of the bodies, said bodies and said locking members being arranged with said side faces of the splines of each body in co-operating abutment with side faces of splines of neighboring bodies and with side faces of a locking member.

2. A moderator structure according to claim 1 wherein each of said locking members extends through two layers of moderator material, side faces of each locking member abutting side faces of splines on bodies in both layers.

3. A moderator structure according to claim 2 wherein the bodies in one of said two layers are angularly displaced relative to the bodies in the other of said two layers thereby to offset their splines, said faces of said locking members being arranged in two groups each group corresponding to a layer of bodies, the faces of one group being obverse of the faces of the other group, said locking members being disposed to interlock the superposed bodies against rotation about their longitudinal axes.

4. A moderator structure according to claim 1 wherein stacked locking members have control rod channels extending therethrough.

5. A moderator structure according to claim 1 wherein each body in each of said columns has a spigot at one end and a complimentary spigot recess at the other end, the spigots and sockets of the bodies in each column in co-operating engagement to effect axial alignment of the bodies.

* * * * *